US009031508B2

United States Patent
Kwon et al.

(10) Patent No.: US 9,031,508 B2
(45) Date of Patent: May 12, 2015

(54) METHOD OF UPDATING INTO SERVICE CATEGORY TABLE IN DEVICE AND DEVICE FOR THE SAME

(71) Applicant: Samsung Electronics Co., Ltd., Gyeonggi-do (KR)

(72) Inventors: Hyuk-Choon Kwon, Seoul (KR); Seung-Hoon Park, Seoul (KR); Ho-Dong Kim, Seoul (KR); Hae-Young Jun, Seoul (KR); Soo-Yeon Jung, Seoul (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 129 days.

(21) Appl. No.: 13/763,008

(22) Filed: Feb. 8, 2013

(65) Prior Publication Data

US 2013/0210359 A1    Aug. 15, 2013

(30) Foreign Application Priority Data

Feb. 10, 2012 (KR) .......................... 10-2012-0013922

(51) Int. Cl.
*H04B 7/00* (2006.01)
*H04W 48/16* (2009.01)
*H04W 48/18* (2009.01)

(52) U.S. Cl.
CPC .............. *H04W 48/16* (2013.01); *H04W 48/18* (2013.01)

(58) Field of Classification Search
CPC .... H04W 84/18; H04W 88/06; H04M 1/7253
USPC ........................... 455/41.2, 414.1, 434, 452.1
See application file for complete search history.

(56) References Cited

U.S. PATENT DOCUMENTS

| | | | |
|---|---|---|---|
| 2013/0089020 A1* | 4/2013 | Hakola et al. ................. | 370/312 |
| 2013/0159537 A1* | 6/2013 | Kwon et al. ................... | 709/227 |
| 2013/0196638 A1* | 8/2013 | Kim et al. ..................... | 455/414.1 |
| 2014/0078089 A1* | 3/2014 | Lee et al. ...................... | 345/173 |
| 2014/0162637 A1* | 6/2014 | Park et al. ..................... | 455/434 |
| 2014/0162671 A1* | 6/2014 | Kim et al. ..................... | 455/452.1 |

* cited by examiner

*Primary Examiner* — April G Gonzales

(57) ABSTRACT

A method for acquiring a service category table required for finding a service includes acquiring information on a latest service category table by identifying version information of a service category table from a broadcasting signal received from adjacent devices during a process of searching for a device supporting a service desired among devices, and acquiring a service category table of a latest version by establishing a session connection with a device supporting the service category table of the latest version based on the information. By acquiring the information on the latest service category table, a session connection with only the device providing the desired service is established so that an optimized session connection establishing process can be performed and a total network capacity can be efficiently managed. Also, the latest service category table can be acquired from the session-connected device, and thus a new service can be easily identified.

20 Claims, 6 Drawing Sheets

METHOD OF UPDATING INTO SERVICE CATEGORY TABLE IN DEVICE AND DEVICE FOR THE SAME

CROSS-REFERENCE TO RELATED APPLICATION(S) AND CLAIM OF PRIORITY

The present application is related to and claims priority under 35 U.S.C. §119(a) to Korean Application Serial No. 10-2012-0013922, which was filed in the Korean Intellectual Property Office on Feb. 10, 2012, the entire content of which is hereby incorporated by reference.

TECHNICAL FIELD

The present application relates generally to a service search device and a method thereof, and more particularly, to a method of acquiring a service category table required for efficiently searching for a service in a system supporting a Device to Device (D2D) direct communication and a device for the same.

BACKGROUND

Devices within a near field communication network should be able to search for each other's ability information. In order to search for the devices and supported service ability information, search protocols in a layer equal to or higher than a third layer of OSI seven layers have been used in the prior art. As an example, a service search process in Wi-Fi, BLUETOOTH or the like, corresponding to a near field communication method will be described below.

In order to search for a service according to a protocol in Wi-Fi or BLUETOOTH, two or more devices should be first connected with each other and configure a network. For example, the network can be configured by directly connecting a smart phone and another smart phone, a notebook and a mouse, a tablet PC and a printer or the like, or can be configured by connecting one device with one or more devices adjacent to the one device, such as a digital camera, an MP3 player, a game machine, a TV and the like.

Accordingly, when a user desires to search for a service by using a device which has not participated in the network, the device should participate in the already configured network or configure a new network with other devices. To this end, the user device should necessarily perform a series of processes of searching for already configured networks and participating in the configured network. In addition, considering the case of Wi-Fi Basic Service Set (BSS), it is necessary for the user device to participate in the network through a connection with an Access Point (AP).

SUMMARY OF THE INVENTION

Since the device may acquire information on devices participating, in a network adjacent to the device on the desired network after configuring a new network or participating, in an already configured network, there is no method of detecting a service supported by the device before entering the network. At this time, the service supported by the device may be known through referencing a service category table which the device already possesses from previous communication with a counterpart device. Further, when the device acquires a latest service category table from the counterpart device or through another network, the device can identify various new services or easily find a device providing the desired service among neighboring devices.

Accordingly, more easily identifying services of counterpart devices before configuring the network and securing a service list (for example, through the service category table) operating on a network may become a very important element for a service distribution of devices using any communication network.

Furthermore, as various applications or services are created in real time, the device is required to rapidly update the service category table belonging to the device to support various services.

Accordingly, to address the above-discussed deficiencies of the prior art, it is a primary object to a method of acquiring a service category table required for efficiently finding a service and a device therefor.

Also, embodiments of the present disclosure provide a method of acquiring a latest service category table and a device therefor.

In certain embodiments of the present disclosure, a method of updating into a latest service category table in a device is provided. The method includes receiving a broadcasting signal (the device corresponding to a first device), the broadcasting signal containing, version information of a service category table for detecting a supportable target service based on Device to Device (D2D) direct communication from second devices located adjacent to the first device; analyzing the version information of the service category table contained in the broadcasting signal and a provision intention of the service category table; and determining a counterpart device having a service category table of a higher version than that of the first device from the second devices having the provision intention of the service category table.

In accordance with certain embodiments of the present disclosure, a device for updating into a latest service category table, the device corresponding to a first device is provided. The device includes a connector that receives a broadcasting signal, (the device corresponding to a first device) the broadcasting signal containing version information of a service category table for detecting a supportable target service based on Device to Device (D2D) direct communication from second devices located adjacent to the first device; and a controller for analyzing the version information of the service category table contained in the broadcasting signal and a provision intention of the service category table, and determining a counterpart device having a service category table of a higher version than that of the first device from the second devices having the provision intention of the service category table.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
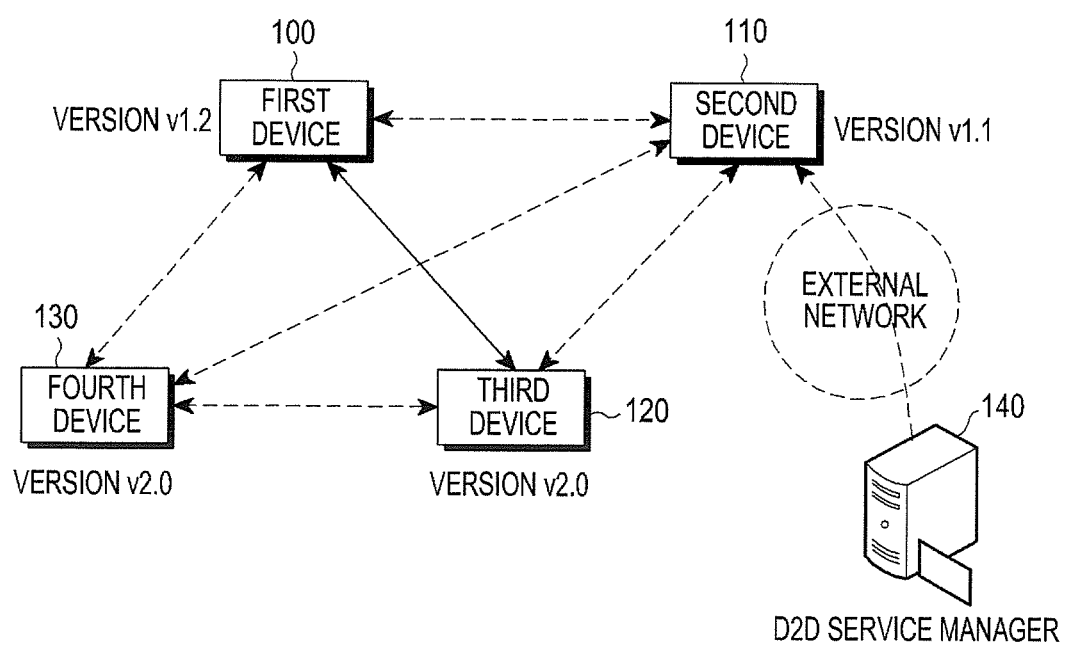
FIG. 1 illustrates an example of a configuration of a D2D network according to an embodiment of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications device. Hereinafter, various embodiments of the present invention will be described with reference to the accompanying drawings. The same elements will be designated by the same reference numerals although they are shown in different drawings. Further, in the following description of the present invention, a detailed description of known functions and configurations incorporated herein will be omitted when it may make the subject matter of the present invention rather unclear.

The detailed description below will provide representative embodiments of the present disclosure to solve the technical problems. Further, for the convenience of descriptions of the present disclosure, names of entities defined in a Device to Device (hereinafter, referred to as D2D) direct communication service will be used, the standard and names do not limit the scope of the present disclosure and can be applied to a system having a similar technical background.

Embodiments of the present disclosure provide a method of acquiring a service category table required for efficiently finding a service. To this end, the present disclosure includes steps of identifying version information of a service category table from a broadcasting signal received from neighboring devices during a process of searching for a device supporting a desired service between devices to acquire information on the latest service category table and establishing a session connection with a device capable of providing the latest version service category table based on the acquired information to acquire the latest version service category table. As described above, by acquiring the information on the latest service category table, the session connection with only the device providing the desired service is established, so that an optimized session connection establishing procedure can be performed and also total network capacity can be efficiently managed. Further, since the latest service category table can be acquired from the session-connected device, it is easy to identify a new service or the like.

Hereinafter, an operation of the device implementing the function described above will be discussed with reference to FIG. 1.

FIG. 1 illustrates a D2D network according to an embodiment of the present disclosure. Referring to FIG. 1, a first device to a fourth device 100, 110, 120, and 130 individually provide and use a service A, a service B, a service C, and a service D within a D2D available service area.

Each of the first device 100 to the fourth device 130 transmits information on the service, which is being used, with reference to the service category table belonging to each of the first device 100 to the fourth device 130 during a service search process. The service category table can vary depending on the device, so that information on the service can contain version information of the service category table.

For example, it is assumed that the second device 110 uses the services A and B, the third device 120 uses the services B and D, and the fourth device 130 uses the service C. In this case, when the first device 100 desires to use the service A, the first device 100 needs to be connected with one of the second device 110 and the third device 120. At this time, when a version of the service category table of the first device 100 is 1.1, a version of the service category table of the second device 110 is 1.2, a version of the service category table of the third device 120 is 2.0, and a version of the service category table of the fourth device 130 is 2.0, the first device 100 searches for the second device 110 and the third device 120 supporting the service A, which the first device 100 desires to use; but the first device 100 only has to be connected to the third device 120 having a higher version. Accordingly, the first device 100 does not need to configure the network with the remaining second and fourth devices 110 and 130.

In certain embodiments, the first device 100 knows version information of the service category table during the service search process. Accordingly, when the first device 100 has a lower version of the service category table, the first device 100 can acquire the latest service category table from a D2D service manager 140 through an external network.

Figure 2:
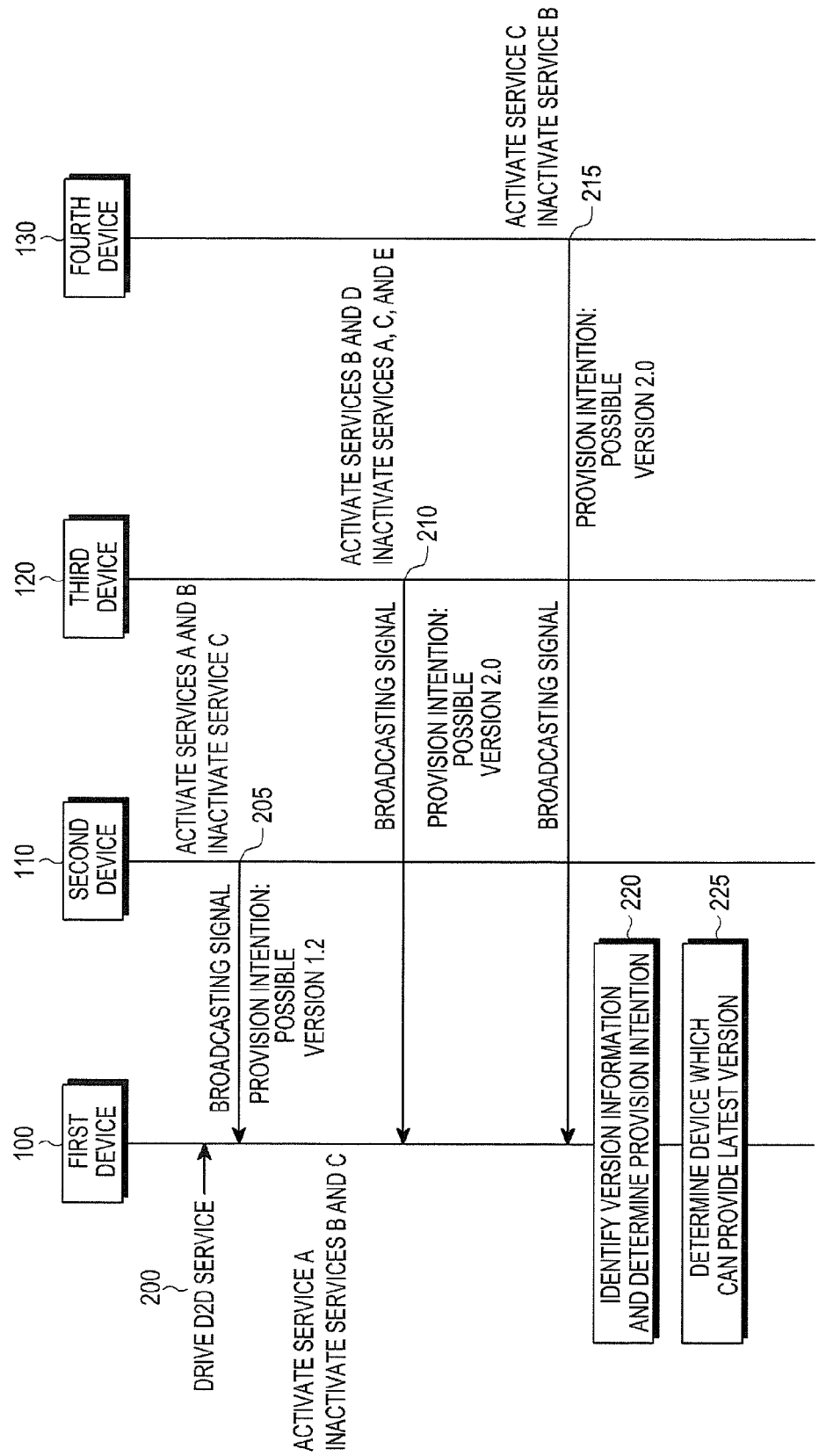
FIG. 2 is a flowchart illustrating operations between devices to acquire a service category table according to an embodiment of the present disclosure.

Hereinafter, operations between the devices to acquire the service category table according to an embodiment of the present disclosure will be described with reference to FIG. 2. FIG. 2 illustrates a case where the first device 100 searches for the device supporting the service A among a plurality of devices located within a D2D available service area when the first device 100 desires to use the service A as a target service. Here, the size of the D2D available service area can have a maximum of several Km radius from the first device 100.

Referring to FIG. 2, when the first device 100 starts driving the D2D service in step 200, the first device 100 receives a broadcasting signal, in steps 205 to 215, containing service information from neighboring devices, such as one or more of, the second device 110, the third device 120, and the fourth device 130. Here, according to an embodiment of the present disclosure, the broadcasting signal can be beacon signal in the system supporting the D2D service. Further, as described above, the broadcasting signal can be received by a user's request for starting the D2D service, but the broadcasting signal can be received when the user enters a particular service area where the D2D service is available, for example, a building supporting the D2D service. In addition, the broadcasting signal can be received as the first device 100 is turned on or an application for the service A is executed by the user.

The broadcasting signal can be received through one of a method in which neighboring devices simultaneously distribute beacon signals having a predetermined period, a method in which each of the neighboring devices periodically distributes the beacon signal according to a scheduled cycle of the network, and a method in which each of the neighboring devices distributes the beacon signal based on a competition during a particular section allocated by the network.

The broadcasting signal contains device identification information, a service name which is being used, version information of the service category table, and intention information.

Here, the device identification (ID) information indicates temporary ID information for identifying devices, the service name which is being used indicates a service that is currently being used in the service category table belonging to itself, and the intention information indicates whether the device has an intention to provide the service category table belonging to itself to another device.

For example, when the second device 100 supports the services A, B, and C, as illustrated in FIG. 2, and currently uses the service A among the listed services, available service information of the broadcasting signal contains the service A. When currently available services are the services A and B, the second device 110 transmits the broadcasting signals containing information on the services A and B.

The first device 100 determines whether to update the service category table by using the version information of the service category table and the intention information among, the service information contained in the broadcasting signals received in steps 205 to 215. Referring to FIG. 2, the service information from the second device 110 indicates that a version of the service category table is 1.2 and there is an intention to provide the service category table, the service information from the third device 120 indicates that a version of the service category table is 2.0 and there is an intention to provide the service category table, and the service information from the fourth device 130 indicates that a version of the service category table is 2.0 and there is no intention to provide the service category table.

In this case, the first device 100 identifies version information of the service category table and determines whether there is an intention to provide the service category table in step 220. As described above, when the first device 100 executes the D2D service, the first device 100 acquire information on the service category table from neighboring devices. As illustrated in FIG. 2, the first device 100 recognizes that there is a service category table having a higher version than the version 1.1 of the service category table belonging to the first device 100 based on version information of the service category tables provided from the third device 120 and the fourth device 130. Accordingly, the first device 100 recognizes that the service category table thereof is required to be updated. Further, the first device 100 can determine which device can transmit detailed information of the service category table based on the intention information.

Therefore, the first device 100 determines that, among the third device 120 and the fourth device 130 having a higher version than that of the first device 100, the third device 120 includes the provision intention as the device capable of providing the latest version in step 225. Thereafter, the first device 100 acquires the actual service category table after establishing a session connection with the determined device, or acquires the service category table through an external network.

Hereinafter, operations and components of the first device 100 will be described with reference to FIG. 3.

Figures 3, 4:
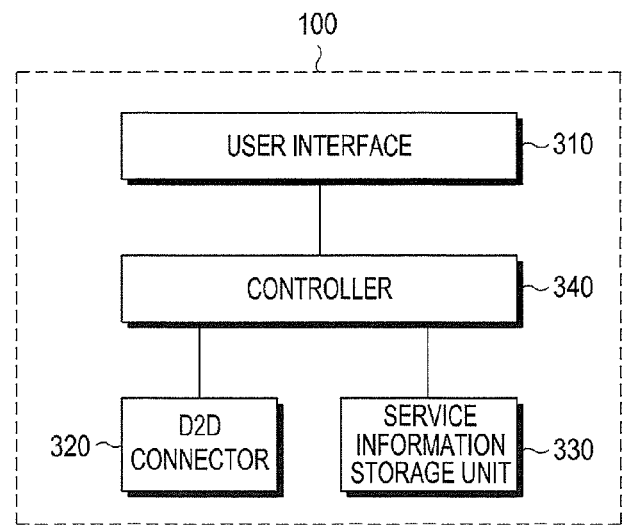
FIG. 3 is an internal block diagram of a device according to an embodiment of the present disclosure.
FIG. 4 illustrates an example of service information contained in a broadcasting signal according to an embodiment of the present disclosure.

Referring to FIG. 3, the first device 100 includes a user interface 310, a D2D connector 320, a service information storage unit 330, and a controller 340. Here, the first device 100 corresponds to a device supporting the D2D service, such as a smart phone, a mobile phone, a digital camera, an MP3 player, a game machine, a TV, a display device, a head unit for a vehicle or the like.

First, the user interface 310 can be implemented in a touch screen type, and serves to display information input by the user or information provided to the user as well as the various menus of the device. Further, the user interface 310 outputs a D2D service related service application list, and outputs a screen according to an execution of a service application selected by the user. In addition, when a plurality of counterpart devices using the same service application as the service application selected by the user are found, the user can select a desired device through the user interface 310.

The D2D connector 320 serves the role of searching for a device that supports a desired service from neighboring devices.

The service information storage unit 330 stores information on a service supported by itself, and stores the service category table, such as Table 1 or 2, according to a predetermined schema. When service information is acquired from neighboring devices, the service information storage unit 330 also stores the acquired service information.

Here, referring to Tables 1 and 2, it can be identified that a service classification system defined in an embodiment of the present disclosure is hierarchically implemented. As shown in Tables 1 and 2, services stored in the first device 100 are hierarchically classified by the defined classification system.

First, the service categories classified for each service type are shown in Table 1.

TABLE 1

| Level 1 | Level 2 | Level 3 |
| --- | --- | --- |
| Communication | Messaging | SMS |
| | | MMS |
| | | IM |
| | | Group MS |
| | | E-mail |
| | Call | VoIP Call |
| | | Video Call |
| | | Group Call |
| Information | Traffic Service | Map |
| | | Navigation |
| | Local info. service | Local Event |
| | | Local weather |
| | | News |
| | | Notice |
| Entertainment | Data service | File Transfer |
| | | Multimedia Streaming |
| | Game | Real-time game |
| Business | Shopping | Shopping |
| | Advertisement | Advertisement |
| | Coupon | Coupon |
| | Banking | Banking |
| Emergency | Emergency | Emergency |

As shown in Table 1 above, the service types can be classified in the unit of levels, that is, hierarchically in an order from a higher level to a lower level. The service category table of Table 1 is only an example, but a configuration of the service category table can vary depending on the device. That is, each device has an inherent service category table, and such a service category contains services in an activated state where a service is being executed in a background or currently used and services in an inactivated state where a service is installed but not executed.

Referring to Table 1, level 1 corresponds to a level indicating a service type, such as communication, information, entertainment, business, emergency or the like. Level 2 corresponds to a detailed type of level 1, which indicates a service type, such as messaging, call or the like when the service type is communication. Level 3 corresponds to a detailed type of level 2, which indicates service names included in a messaging service when the service type of level 1 is communication and the detailed type of level 2 is messaging.

Further, the services classified based on a portal are as shown in Table 2.

TABLE 2

| Level 1 | Level 2 |
| --- | --- |
| NAVER | Messaging |
| | Call |
| | Traffic Service |
| | Local info. Service |
| | Data Sharing |
| | Game |
| | Shopping |
| | Advertisement |
| | Coupon |
| | Banking |
| | Emergency |
| DAUM | |
| SAMSUNG | |
| APPLE | |
| GOOGLE | |
| SKT | |
| KT | |
| U+ | |

The services can be classified in various ways as well as the above described method. The services can be classified into AV streams, such as a video stream and an audio stream, classified based on a social network, based on messaging and a position, and classified based on a service provider, such as NAVER, SAMSUNG, GOOGLE, or the like.

The service information storage unit 330 stores version information of the service category table which the service information storage unit 330 currently has among the service information. The service category table has a table form categorizing as being included in level 1 to level 3 as shown in Tables 1 and 2, and it is preferable that each device has the service category table. Further, such a table can be distributed by a provider providing the D2D service, and can be continuously managed and updated of course.

In addition, the service information storage unit 330 stores intention information of the service information, which indicates an intention whether to provide the service category table, such as Table 1 or 2.

The controller 340 controls each of the components according to the service search process of finding a device which can use a target service from neighboring devices. The controller 340 receives the broadcasting signal from neighboring devices in order to search for the device which can use the target service, and identifies a version of the service category table based on the service information contained in the received broadcasting signal. Accordingly, the controller 340 determines whether to update its own service category table. In this case, when the device using the target service is found, the controller 340 first establishes a session connection with the found device, and then checks a mutual security state to receive the service category table. Subsequently, when acquiring the service category table, the controller 340 determines whether a separate program is required to execute the target service. When there is no program required for executing the target service, the controller 340 makes a request for the program to the found device and receives the program.

Meanwhile, a structure of the service information contained in the broadcasting signal is illustrated in FIG. 4.

Referring to FIG. 4, a temporary ID field 400 includes terminal identification information temporarily used in a local area, a service field 405 which is being used includes a service name which is currently being used, a version information field 410 includes a version of the service category table thereof, an intention information field 415 includes an intention whether to provide its own service category table, a level field 420 includes information on a start level of the service category table, and a counter field 425 includes scheduling information required for determining, the level of the service category table including a currently used service name. In FIG. 4, a reserved field 430 corresponds to an expandable field.

Operations of the first device 100 will be described with reference to FIG. 5.

Figure 5:
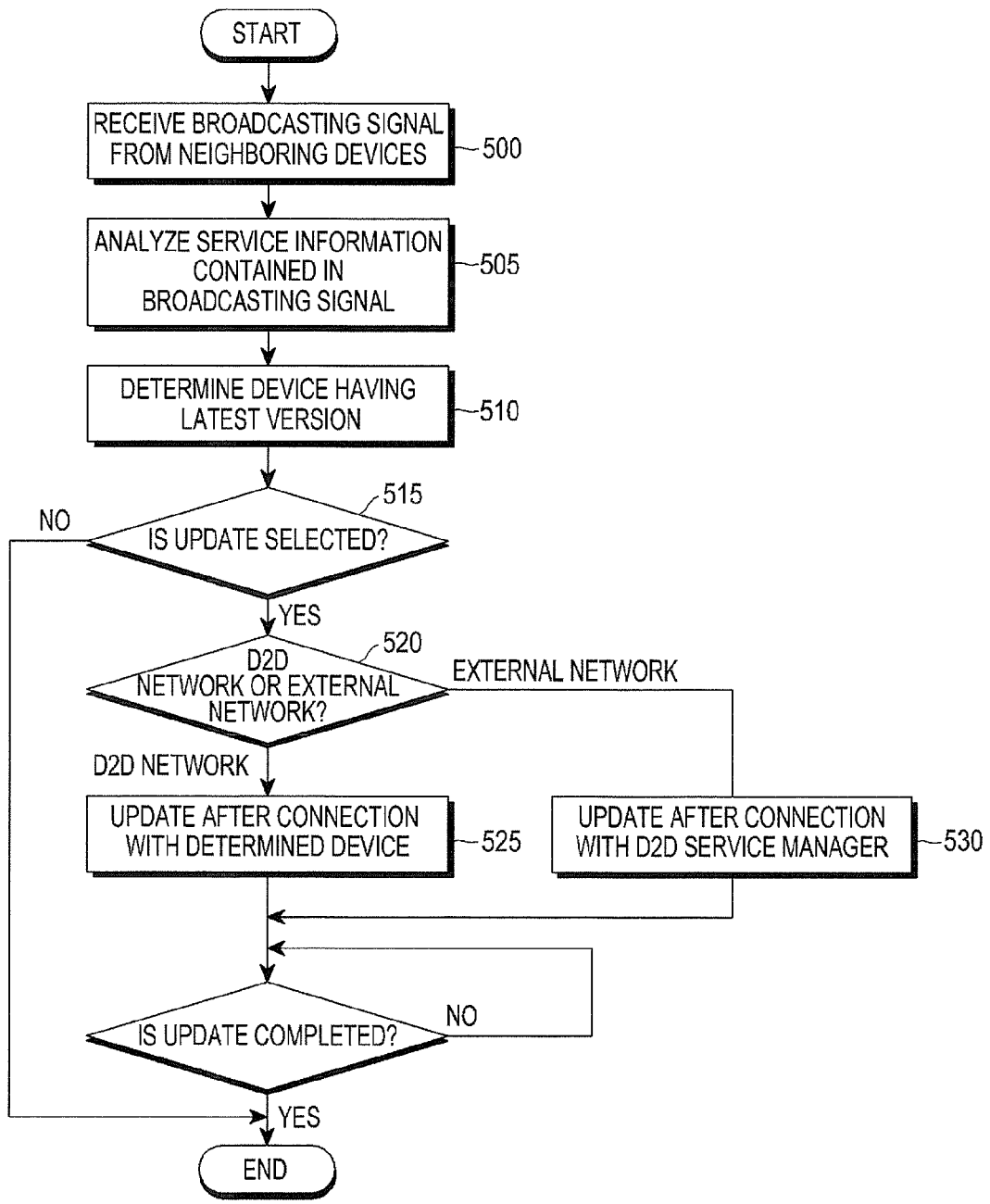
FIG. 5 is a flowchart illustrating operations in a device to acquire a service category table according to an embodiment of the present disclosure.

Referring to FIG. 5, when the first device 100 receives a broadcasting signal from neighboring devices in step 500, the first device 100 analyzes service information contained in the broadcasting signal in step 505. Based on a result of the analysis, the first device 100 can determine whether there is a device having a higher version than that of the service category table belonging to the first device 100. Accordingly, the first device 100 determines a device having the latest version with reference to version information and intention information acquired during a service search process in step 510.

When it is determined that an update is needed and then the update is selected in step 515, the first device 100 determines whether an update scheme through a D2D network or an external network is selected in step 520. When the D2D network scheme is selected, the first device 100 is connected with the determined device and then updates the service category table in step 525. Alternatively, when the external network scheme is selected, the first device 100 is connected with the D2D service manager 140 and then updates the service category table in step 530. Then, the first device 100 determines whether the update has been completed in step 535. When the update is completed, the first device 100 terminates an operation for updating the service category table.

Figure 6:
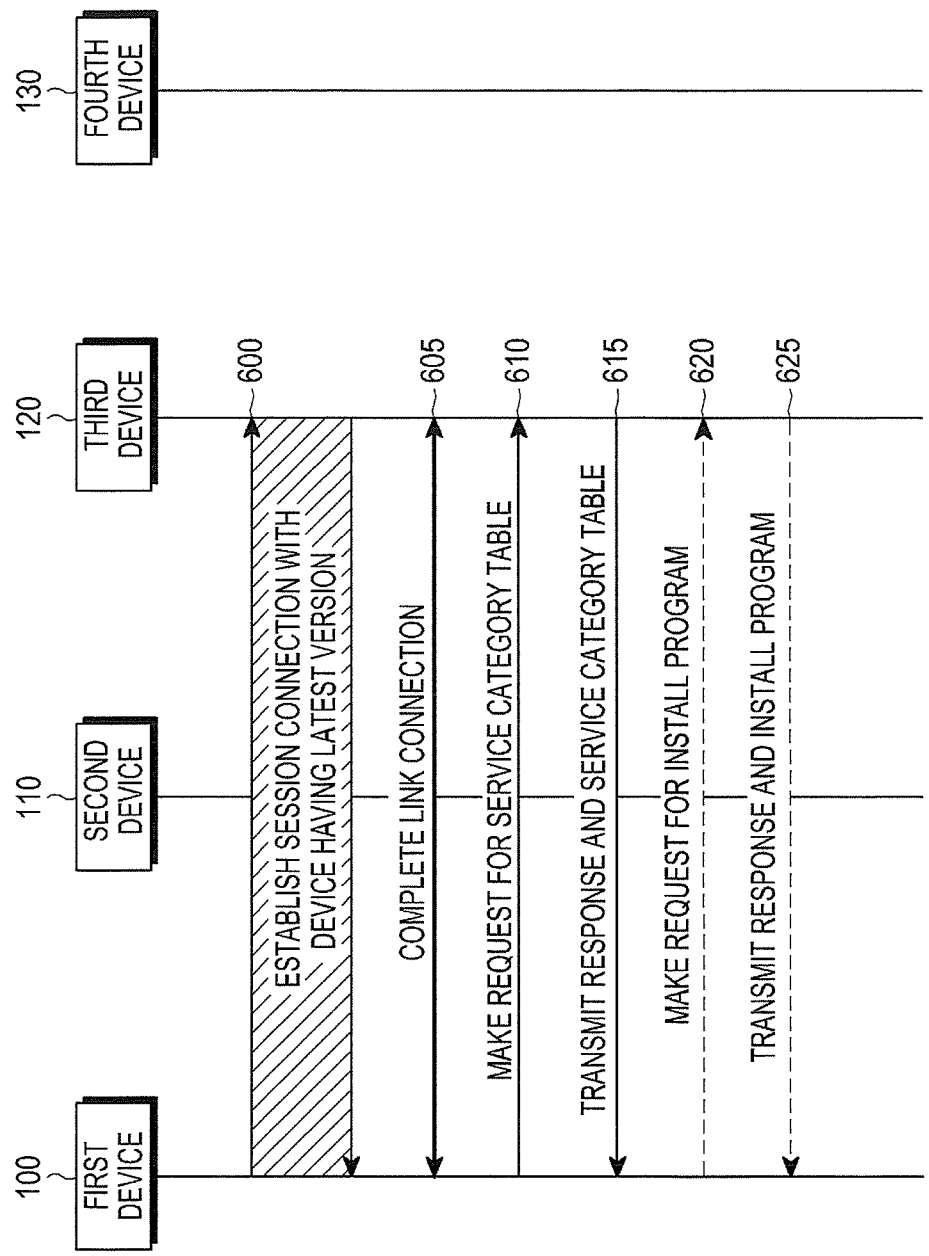
FIG. 6 is a flowchart for describing a process of updating a service category table according to an embodiment of the present disclosure.

Each of the update processes according to the D2D network scheme and the external network scheme will be separately described with reference to FIGS. 6 and 7. FIG. 6 illustrates the update process according to the D2D network scheme, and FIG. 7 illustrates the update process according to the external network scheme.

Referring first to FIG. 6, when the first device 100 determines to acquire the service category table from the third device 120, the first device 100 establishes a session connection with the third device 120 having the latest version in step 600, and completes a link connection in step 605. Such a determination is achieved by identifying version information of the service category table, an intention whether to provide the service category table or the like based on the service information acquired during the service search process. According to the link connection through which the mutual security is maintained, the first device 100 makes a request for the service category table in step 610. Then, the first device 100 receives the service category table together with a response to the request from the third device 120 in step 615.

At this time, when a new service is detected with reference to the acquired service category table or a program required for the target service desired to be used is additionally required, the first device 100 makes a request for an install program in step 620; and then receives the install program together with a response to the request in step 625.

Figure 7:
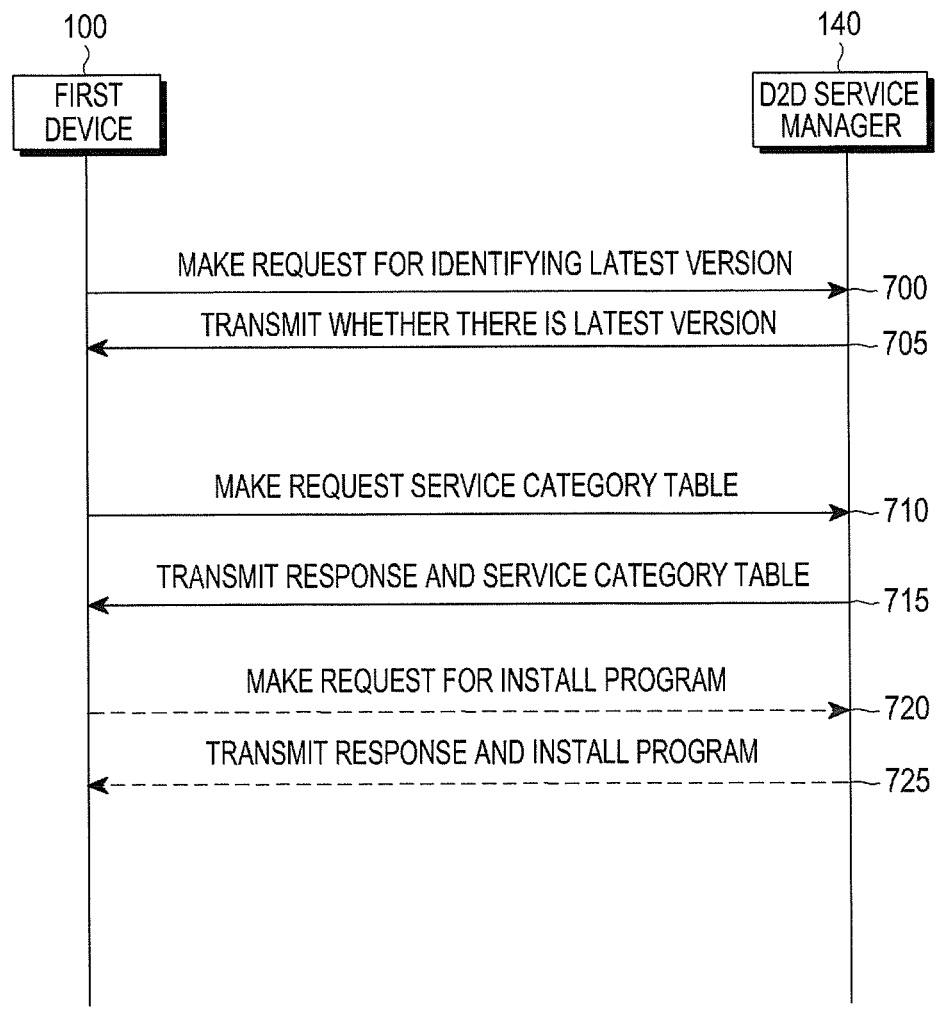
FIG. 7 is a flowchart for describing a process of updating a service category table according another embodiment of the present disclosure.

Meanwhile, referring to FIG. 7, when the first device 100 recognizes the necessity of updating the service category table during the service search process, the first device 100 can determine that there is the service category table having the latest version. Accordingly, the first device 100 knows that there is the higher version than that of the service category table belonging to itself, but does not know whether the version is the latest version. Therefore, the first device 100 transmits a request for identifying the latest version to the D2D service manager 140 to identify the latest version in step 700. In response to the request, the D2D service manager 140 informs the first device 100 whether there is the latest version in step 705.

When there is the latest version, the first device 100 makes a request for the service category table to the D2D service manager 140 in step 710, and receives the service category table having the latest version in step 715. Hereinafter, since steps 720 to 725 are the same as steps 620 to 625 of FIG. 6, detailed descriptions thereof will be omitted.

According, to embodiments of the present disclosure, when a service which can be used between devices is searched for, information on the service category table can be acquired, so that an application required for performing the latest service can be rapidly updated and a device user can easily identify the latest service.

According to embodiments of the present disclosure, it is possible to acquire the service category table required for identifying a service supported by the device in a system supporting Device to Device (D2D) direct communication without a session connection with all neighboring devices. Also, there is an effect of effectively supporting various services since the service category table can be updated in real time when various applications or services are created.

It can be appreciated that the embodiments of the present disclosure can be implemented in software, hardware, or a combination thereof. Any such software can be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present invention. Therefore, embodiments of the present invention provide a program including codes for implementing a system or method claimed in any claim of the accompanying claims and a machine-readable device for storing such a program. Further, this program can be electronically conveyed through any medium such as a communication signal transferred via a wired or wireless connection, and embodiments of the present invention appropriately include equivalents thereto.

Further, the device can receive the program from a program providing apparatus connected to the device through a wire or wirelessly and store the program. The program providing apparatus can include a program including instructions through which the device implements a preset content protecting method, a memory for storing information or the like required for the content protecting method, a communication unit for performing wired or wireless communication with the device, and a controller for transmitting the corresponding program to the device according to a request of the device or automatically.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of updating into a latest service category table in a device, the method comprising:
   receiving a broadcasting signal, by the device, the broadcasting signal comprising version information of a service category table for detecting a supportable target service based on Device to Device (D2D) direct communication from one or more adjacent devices located adjacent to the device;
   identifying in a subset of the one or more adjacent devices having a newer version of a service category table than a version of a service category table of the device, a counterpart device having the newer version of the service category table configured for use by another device;
   establishing a session connection with the counterpart device; and
   performing the target service with the counterpart device.

2. The method of claim 1, further comprising acquiring the service category table from the counterpart device when determining that the counterpart device exists.

3. The method of claim 1, further comprising:
   transmitting to an external network a request for identifying a latest version of the service category table belonging to the first device; and
   when a response is received informing that the latest version of the service category table exists, acquiring the latest version of the service category table from the external network.

4. The method of claim 1, wherein the broadcasting signal comprises service information including at least one of temporary identification information of the one or more adjacent devices, a service name which is currently being used, version information of the service category table, and information indicating if the service category table is configured for use by another device.

5. The method of claim 4, wherein identifying the counterpart device comprises:
   searching for the counterpart device from the one or more adjacent devices using the target service based on the service information.

6. The method of claim 1, wherein the service category table stores services that are supported by the one or more adjacent devices and classifies the services according to each service type.

7. The method of claim 6, wherein the service type is hierarchically classified in an order from a higher level to a lower level.

8. A device configured to update a service category table, the device comprising:
   a transceiver configured to receive a broadcasting signal, the broadcasting signal comprising version information of a service category table for detecting a supportable target service based on Device to Device (D2D) direct communication from one or more adjacent devices located adjacent to the device; and a controller configured to:
- identify, in a subset of the one or more adjacent devices having a newer version of a service category table than a version of a service category table of the device, a counterpart device having the newer version of the service category table configured for use by another device,
- establish a session connection with the counterpart device, and
- perform the target service with the counterpart device.

9. The device of claim 8, wherein the controller is configured to acquire the service category table from the counterpart device when it is determined that the counterpart device exists.

10. The device of claim 8, wherein the controller is configured to transmit a request to an external network to identify a latest version of the service category table of the first device, and when receiving a response informing that the latest version of the service category table exists, the controller is configured to acquire the latest version of the service category table from the external network.

11. The device of claim 8, wherein the broadcasting signal comprises service information including at least one of temporary identification information of the one or more adjacent devices, a service name which is currently being used, version information of the service category table, and information indicating if the service category table is configured for use by another device.

12. The device of claim 11, wherein the controller is configured to search for the counterpart device from the one or more adjacent devices using the target service based on the service information.

13. The device of claim 8, further comprising a service information storage unit configured to store the service category table that classifies services for each service type supported by the one or more adjacent devices, wherein the service type is hierarchically classified in an order from a higher level to a lower level.

14. The device of claim 8, further comprising a user interface configured to output a screen according to an execution of the supportable target service based on the D2D direct communication.

15. A non-transitory machine-readable storage medium comprising a plurality of instructions, the plurality of instructions configured to, when executed by a processor, cause the processor to:
- receive a broadcasting signal, the broadcasting signal comprising version information of a service category table for detecting a supportable target service based on Device to Device (D2D) direct communication from one or more adjacent devices located adjacent to a device comprising the processor;
- identify, in a subset of the one or more adjacent devices having a newer version of a service category table than a version of a service category table of the device, a counterpart device having the newer version of the service category table configured for use by another device;
- establish a session connection with the counterpart device; and
- perform the target service with the counterpart device.

16. The non-transitory machine-readable storage medium of claim 15, wherein the plurality of instructions are further configured to, when executed by the processor, cause the processor to:
- acquire the service category table from the counterpart device when it is determined that the counterpart device exists.

17. The non-transitory machine-readable storage medium of claim 15, wherein the plurality of instructions are further configured to, when executed by the processor, cause the processor to:
- transmit a request to an external network for a latest version of the service category table belonging to the first device; and
- when a response is received informing that the latest version of the service category table exists, acquire the latest version of the service category table from the external network.

18. The non-transitory storage medium of claim 15, wherein the broadcasting signal comprises service information including at least one of temporary identification information of the one or more adjacent devices, a service name which is currently being used, version information of the service category table, and information indicating if the service category table is configured for use by another device.

19. The non-transitory machine-readable storage medium of claim 18, wherein the plurality of instructions are further configured to, when executed by the processor, cause the processor to:
- search for the counterpart device from the one or more adjacent devices using the target service based on the service information.

20. The non-transitory machine-readable storage medium of claim 15, wherein the service category table stores services that are supported by the one or more adjacent devices and classifies the services according to each service type, wherein the service type is hierarchically classified in an order from a higher level to a lower level.

* * * * *